G. Favinger
Clothes Frame,
N° 65,735.
Patented June 11, 1867
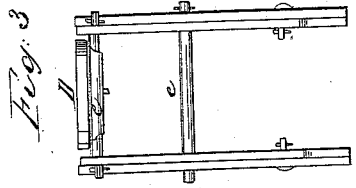
Fig. 3
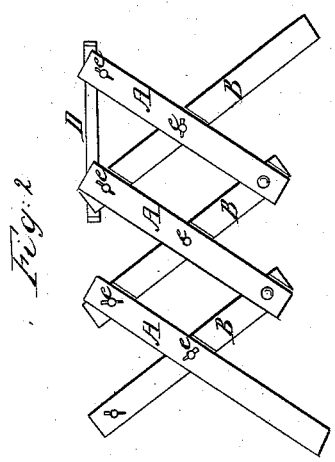
Fig. 2
Fig. 4
Fig. 1
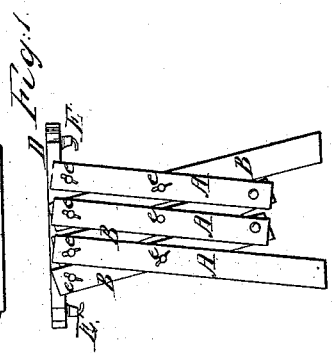
Witnesses
A. N. Marr
V. J. Stockwell
Inventor
George Favinger
by
Alexander & Mash
Att'ys

United States Patent Office.

GEORGE FAVINGER, OF PITTSFORD, MICHIGAN.

Letters Patent No. 65,735, dated June 11, 1867.

---

IMPROVED CLOTHES-DRYER AND STAND COMBINED.

---

The Schedule referred to in these Letters Patent and making part of the same.

---

TO ALL WHOM IT MAY CONCERN:

Be it known that I, GEORGE FAVINGER, of Pittsford, in the county of Hillsdale, and in the State of Michigan, have invented certain new and useful improvements in Combined Clothes-Racks and Stands; and do hereby declare that the following is a full, clear, and exact description thereof, reference being had to the accompanying drawings, and to the letters of reference marked thereon.

In the annexed drawings, making part of this specification, A and B represent a series of bars or slats, which, when placed crosswise of each other and secured together, as seen in Figure 2 or Figure 1, form one side of a frame for a clothes-rack. Another side of a rack is formed similarly to this, and the two are connected together and at a suitable distance apart by means of two series of rounds $e\ e$. This frame when secured together may be shut up, as seen in fig. 1, or opened out, as seen in fig. 2. When the frame is closed up, as shown in fig. 1, a cover, D, which is provided on its under side with hooks E E, may be placed upon it, resting upon the upper rounds with its hooks catching over the outside rounds, and thus be made to form a small table. The frame may be opened, as seen in fig. 2, and the cover D placed upon it with its hooks catching over one of the outside rounds and the one contiguous to it, both of the upper series, and an ironing-table may be formed, leaving a portion of the frame with its rounds upon which the clothes may be hung to air and thoroughly dry after being ironed.

I am aware that frames similarly constructed to that which I have described have been used before, hence I disclaim the frame of itself; but having thus fully described my invention, what I claim as new, and desire to secure by Letters Patent, is—

The cover D, provided with its hooks E E for holding the frame, as constructed, in the desired position, and forming a stand for the clothes, when combined and used for the purposes specified.

In testimony that I claim the foregoing I have hereunto set my hand and seal this 4th day of March, 1867.

GEORGE FAVINGER.

Witnesses:
  ANTON BACKUS,
  LETITIA BACKUS.